US012710913B2

(12) United States Patent
Cormack et al.

(10) Patent No.: US 12,710,913 B2
(45) Date of Patent: Aug. 18, 2026

(54) VIRTUAL SERIALIZATION/DESERIALIZATION DISPLAY SHARING

(71) Applicant: Intel Corporation, Santa Clara, CA (US)

(72) Inventors: Christopher J. Cormack, Portland, OR (US); Adam T. Lake, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/990,737

(22) Filed: Dec. 20, 2024

(65) Prior Publication Data

US 2026/0178257 A1 Jun. 25, 2026

(51) Int. Cl.

| | |
|---|---|
| ***G06F 3/14*** | (2006.01) |
| ***G07C 5/08*** | (2006.01) |
| ***H04N 7/08*** | (2006.01) |
| ***H04N 21/414*** | (2011.01) |
| ***H04N 21/61*** | (2011.01) |

(52) U.S. Cl.

CPC ......... *G06F 3/1454* (2013.01); *G07C 5/0808* (2013.01); *G07C 5/0825* (2013.01); *H04N 7/08* (2013.01); *G09G 2370/20* (2013.01); *G09G 2370/24* (2013.01); *G09G 2380/10* (2013.01); *H04N 21/41422* (2013.01); *H04N 21/6175* (2013.01)

(58) Field of Classification Search

CPC ... G06F 3/1454; G07C 5/0808; G07C 5/0825; H04N 7/08; H04N 21/41422; H04N 21/6175; G09G 2370/24; G09G 2380/10; G09G 2370/20

See application file for complete search history.

(56) References Cited

U.S. PATENT DOCUMENTS

2012/0284419 A1* 11/2012 Brenes .............. H04N 21/4122 709/231

FOREIGN PATENT DOCUMENTS

| | | | | |
|---|---|---|---|---|
| CN | 119653141 A | * | 3/2025 | .......... H04N 13/117 |
| DE | 102021115206 A1 | * | 12/2022 | ............ H04N 19/80 |

* cited by examiner

*Primary Examiner* — Douglas Wilson

(74) *Attorney, Agent, or Firm* — Schwegman Lundberg & Woessner, P.A.

(57) ABSTRACT

A system may receive information from a system under test, such as an automotive system under test, and capture multiple display streams from the system under test. The display streams may be processed and composited using virtual serializer/deserializer (virtual SerDes) operations that combine the multiple streams into a single super-frame format. The composited stream is then encoded and broadcast. The system may enable multiple users to simultaneously access and interact with the display streams remotely, with the virtual SerDes operations supporting numerous logical displays for software development and validation. The system may provide synchronized display viewing and allows dynamic switching between multi-display tiled views and single display views while preserving spatial and interleaved super-frame formats.

20 Claims, 6 Drawing Sheets

VIRTUAL SERIALIZATION/DESERIALIZATION DISPLAY SHARING

BACKGROUND

Internet Protocol-based Keyboard Video Mouse (IP-KVM) devices enable remote access to systems under test by capturing and transmitting display, keyboard, and mouse data across networks. These systems process and composite multiple concurrent display streams while preserving timing and formatting requirements of specialized display interfaces. For example, IP-KVM devices may be used with consolidated development platforms that incorporate sophisticated display sharing capabilities to support collaborative debugging across distributed teams.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
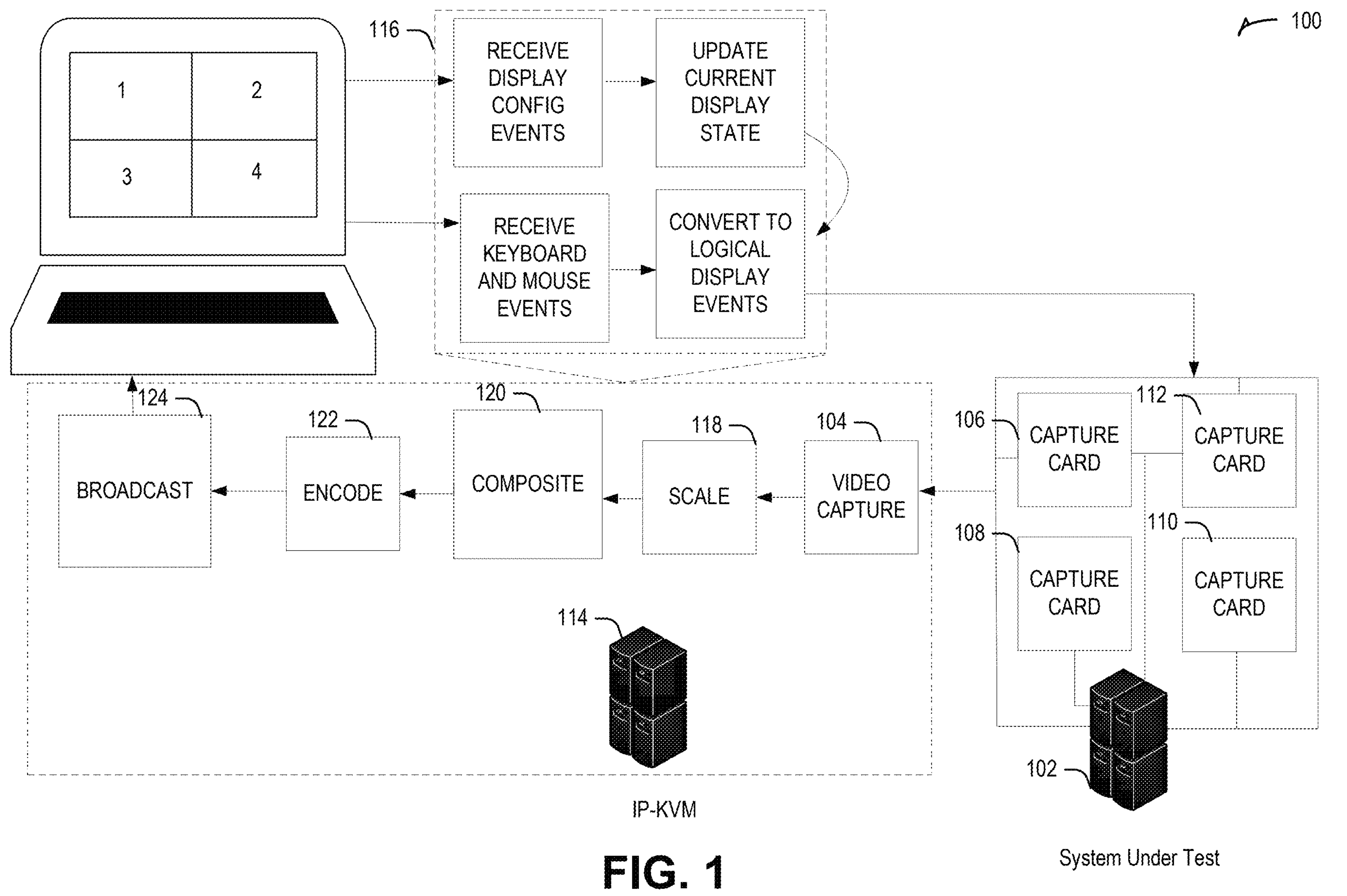
FIG. 1 is a block diagram showing components of a display sharing system according to some examples.

The present disclosure relates to virtual serializer/deserializer (SerDes) display sharing systems and methods for enabling remote development and validation of software (such as automotive software) using Internet Protocol-based Keyboard Video Mouse (IP-KVM) devices. Development and validation of consolidated software platforms requires handling multiple concurrent display streams while maintaining compatibility with specialized display interfaces. For example, automotive development environments may require developers to work with multiple independent displays simultaneously. Current approaches often require expensive custom hardware development boards costing thousands of dollars each, along with numerous physical displays that must be connected to these boards. Often, the number of physical displays that can be connected to the boards are limited to four or fewer. Additionally, development teams spread across different geographic locations face logistical challenges in sharing these costly development resources, making collaborative debugging difficult.

The disclosed systems and methods provide solutions for remote display sharing using Internet Protocol-based Keyboard Video Mouse (IP-KVM) devices with serializer/deserializer (SerDes) capabilities (e.g., virtual SerDes). The systems may maintain constant bit rate encoding to ensure consistent network bandwidth usage regardless of the number or resolution of the displays being processed. Alternatively, the system can reduce the display resolution, refresh rates, or depth per pixel to reduce total network bandwidth utilization. These systems may receive multiple display streams from a system under test and process them using video capture hardware. The IP-KVM device may composite these streams into a single stream by combining them into super-frame formats that preserve both spatial and interleaved display arrangements. This composited stream may then be encoded and broadcast to remote users or recorded for later analysis. A super-frame format refers to a display output format that combines multiple independent display streams into a single unified output frame, either by spatially arranging the displays in a grid layout or by interleaving scan lines from different displays sequentially.

The following systems may implement virtual SerDes operations that support sixteen or more logical displays for software development and validation purposes. This allows developers to work with multiple displays simultaneously without requiring physical access to expensive custom hardware. In an example, the SerDes operations may be used in such a way so as to provide a combination of standard and logical displays. The system may be configured to utilize any number of standard displays and/or logical displays as appropriate or desired. For example, SerDes may be enabled for a single display pipe providing three standard displays and two logical SerDes enabled displays, for a total of five overall displays, a single display pipe providing two SerDes displays, for a total of two displays, or the like. The virtual SerDes implementation may function or operate identically to hardware SerDes solutions used in production environments, ensuring software compatibility across development and deployment platforms. Input device interactions may be managed by converting keyboard, mouse, and touch events to logical display coordinates based on the active display layout. This enables natural interaction with individual displays within composite views. The system may support dynamic switching between different display compositing modes, allowing users to seamlessly transition between multi-display tiled views and single display views as needed for detailed analysis.

Multiple developers may simultaneously access and interact with the display streams remotely, enabling parallel testing and collaborative debugging across distributed teams. The system may preserve display synchronization across outputs while maintaining zero performance overhead on the system under test. This approach may significantly reduce development costs by eliminating the need for multiple expensive custom hardware boards and numerous physical displays at each development location.

The specialized display interfaces supported by these systems include both spatial and interleaved super-frame formats used in automotive applications. The display processing pipeline handles format-aware scaling, proper deserialization ordering, and management of asymmetric display resolutions with appropriate padding. This ensures that display outputs maintain compatibility with production hardware while enabling flexible development and validation workflows. These capabilities may provide substantial benefits including reduced hardware costs, improved collaboration across distributed teams, earlier integration testing, and more efficient validation of complete software stacks.

The system's zero-overhead implementation and compatibility with production display protocols helps ensure that software validated in this environment will function correctly when deployed on custom hardware platforms.

FIG. 1 is a block diagram showing components of a display sharing system 100 according to some examples. The display sharing system 100 may include a system under test 102 that generates display data, such as one or more video or display streams through multiple capture cards 106, 108, 110, and 112. An Internet Protocol-based Keyboard Video Mouse (IP-KVM) device (IP-KVM device 114) may include video capture hardware 104 that receives or is configured to receive the display streams from the capture cards of the system under test 102. The video capture hardware 104 processes the incoming display data streams for further handling by the IP-KVM device 114.

The IP-KVM device 114 may include an event processor 116 that may be configured to receive display configuration events, receive keyboard and mouse events, update the current display state based on the received display configuration events, and convert the keyboard and mouse events to logical display coordinates or events based on the active display layout. The event processor 116 may send the converted keyboard and mouse events (the logical display events or coordinates) to the system under test 102. The event processor 116 may be further configured to maintain coordinate mapping between the composite display view and individual logical displays, enabling proper routing of keyboard and mouse interactions to the appropriate display within the system under test 102. A scaler 118 may process or be configured to process the captured display streams to adjust their resolution, per pixel depth, or refresh rate while preserving the display format. The scaled outputs may be provided to a compositor 120 that combines or is configured to combine the multiple display streams into a unified output. The compositor 120 may arrange the displays in various layouts, such as a tiled matrix view showing all displays simultaneously. In an example, the compositor 120 may be agnostic and may include a variety of display layouts including tiled matrix, zoom-in, and may highlight one particular display of focus while maintaining visibility of the other displays, a zoom in and focus on a single display, or other configurations as desired.

An encoder 122 may process or be configured to process the composited stream and a broadcaster 124 may transmit or be configured to transmit the encoded stream to remote users. In some examples, instead of broadcasting, the system may record the encoded stream for later analysis, such as for debugging or validation purposes. The recording may include markers indicating specific events or anomalies (e.g., visual artifacts) for subsequent review. Some examples of anomalies may include dropped or blank frames (e.g., due to a synchronization primitive programming error), incorrect or blank pixels within a specific region due to a hardware or programmer error, tiles of pixels being blank or oversaturated or undersaturated or not being updated at all reflecting the results of a previous frame. In some examples, the encoded stream may be broadcast to a cloud-based server or the recording may be stored to a cloud-based storage system.

The system may process multiple concurrent display streams in this configuration, with the video capture hardware 104 receiving display data from each capture card in the system under test 102. The system may encode the streams using ultra-low latency encoding to maintain responsive interaction. The scaler 118 and compositor 120 may work together (e.g., in conjunction with each other) to maintain zero performance overhead on the system under test 102 by performing all video processing operations within the IP-KVM device 114.

Figure 2:
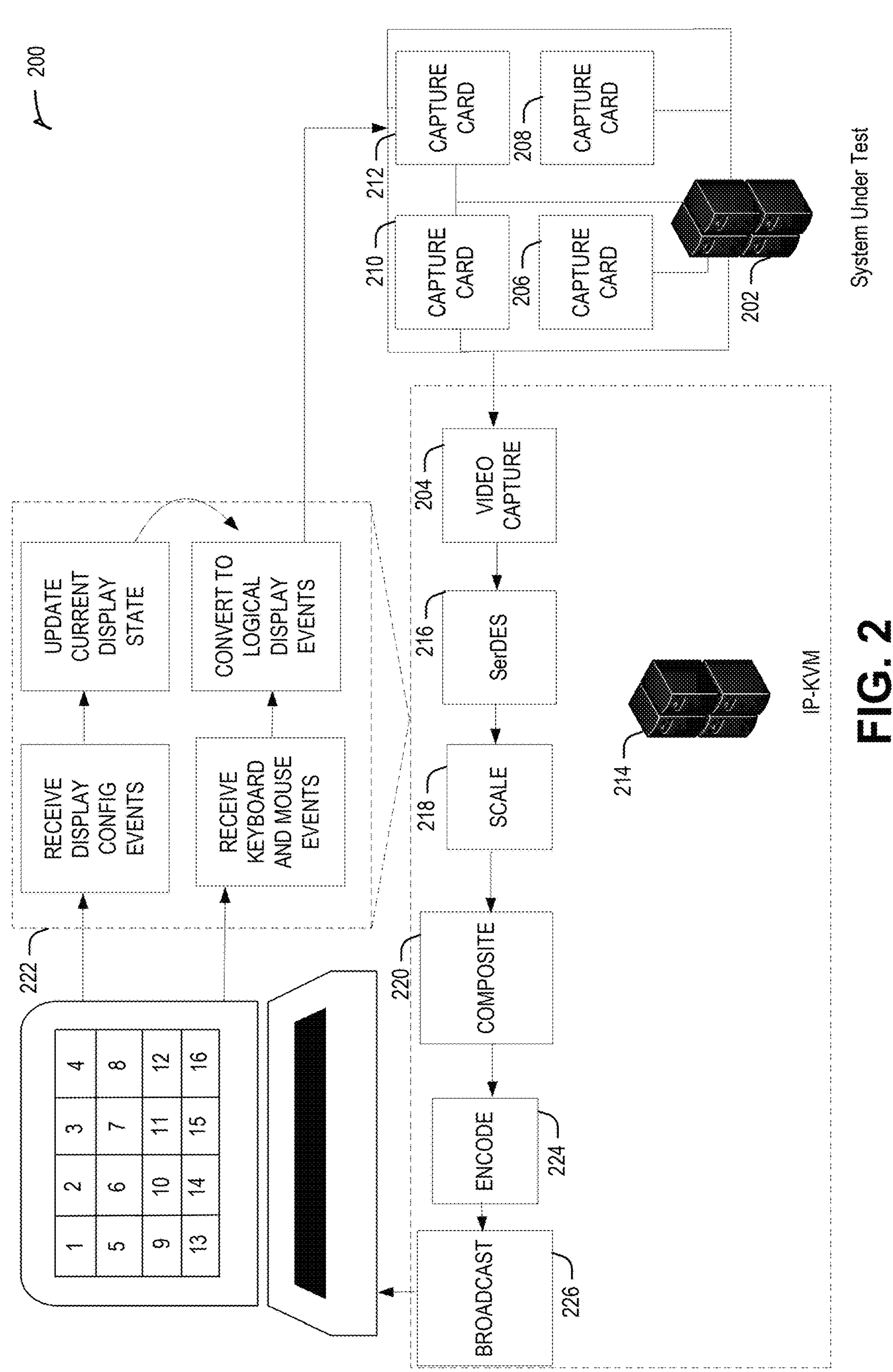
FIG. 2 is a block diagram showing components of a display sharing system with serializer/deserializer (SerDes) functionality according to some examples.

FIG. 2 is a block diagram showing components of a display sharing system 200 with SerDes functionality according to some examples. The system 200 may include a system under test 202 that generates display data through multiple capture cards 206, 208, 210, and 212. FIG. 2 differs from FIG. 1 by illustrating the system configuration when operating with SerDes emulation enabled, which allows for support of sixteen or more concurrent displays compared to the four display limitation shown in FIG. 1.

An Internet Protocol-based Keyboard Video Mouse device (IP-KVM device 214) may include video capture hardware 204 that receives or is configured to receive the display streams from the capture cards of the system under test 202. A SerDes component 216 may process or be configured to process the captured display streams to provide virtual serializer/deserializer functionality that matches the behavior of hardware SerDes components used in production systems, such as combining multiple display streams into spatial or interleaved super-frame formats, where spatial formats arrange displays in a grid layout and interleaved formats alternate scan lines from different displays. The SerDes component 216 may support both spatial and interleaved super-frame formats. The SerDes component 216 may be extensible to support various vendor-specific SerDes protocols. In a spatial format, multiple displays may be combined into grid layouts. In an interleaved format, scan lines from multiple displays may be alternated. The SerDes component 216 may handle asymmetric display resolutions by adding appropriate padding when displays have different dimensions.

A scaler 218 may process or be configured to process the deserialized display streams to adjust their resolution, bit depth, or frame rate while preserving the display format. The scaler 218 may be format-aware to ensure proper handling of both spatial and interleaved display arrangements. The scaled outputs may be provided to a compositor 220 that combines or is configured to combine the multiple display streams into a unified output.

The IP-KVM device 214 may include an event processor 222 configured to receive display configuration events, receive keyboard and mouse events, update the current display state based on the received display configuration events, and convert the keyboard and mouse events to logical display coordinates or events based on the active display layout. In an example, the event processor may pass or send the converted keyboard and mouse events (the logical display events or coordinates) back to the system under test 202. The event processor 222 may further be configured to maintain coordinate mapping between the composite display view and individual logical displays while accounting for the SerDes display arrangements to ensure proper routing of input events to the appropriate display within the system under test 202.

An encoder 224 may process or be configured to process the composited stream and a broadcaster 226 may transmit or be configured to transmit the encoded stream to remote users. In some examples, instead of broadcasting, the system may record the encoded stream for later analysis. The encoded stream may be broadcast (such as to a cloud-based server) or the recording may be stored to a local or cloud-based storage system. The system may support recording at native resolution for detailed analysis while broadcasting at a lower resolution to accommodate network conditions.

The system may support dynamic switching between different display compositing modes, enabling transitions between multi-display tiled views and single display views. The coordinate conversion system may account for these display mode changes to maintain proper input device mapping across all supported display configurations.

Figure 3:
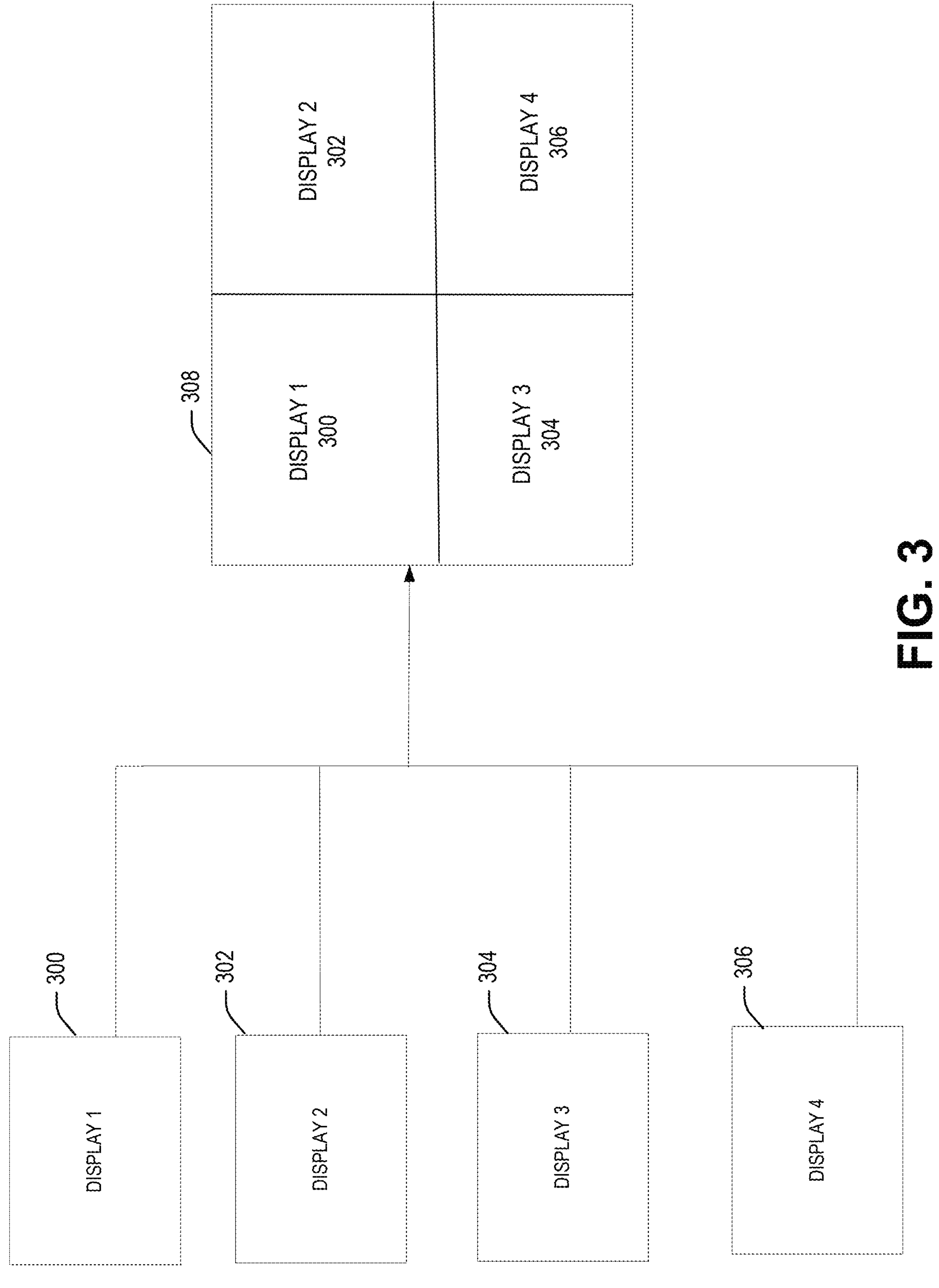
FIG. 3 is a diagram showing examples of spatial super-frame formats according to some examples.

FIG. 3 is a diagram showing examples of spatial super-frame formats according to some examples. The diagram illustrates how multiple independent display streams 300, 302, 304, and 306 may be combined into a unified super-frame display output 308. The diagram includes four separate input displays labeled as Display 1 (300), Display 2 (302), Display 3 (304), and Display 4 (306), each represented by different boxes. In an example, the displays may correspond to different automotive display outputs such as instrument clusters, infotainment displays, digital mirrors, or other vehicle displays.

As shown in FIG. 3, the spatial super-frame format combines the four displays by arranging them in a 2×2 grid layout within a single super-frame display output 308. Display 1 (300) is positioned in the upper left quadrant, Display 2 (302) in the upper right quadrant, Display 3 (304) in the lower left quadrant, and Display 4 (306) in the lower right quadrant of the super-frame. In this spatial arrangement, each display may maintain its relative position and proportions within the grid layout. The displays may be of equal size (or substantially equal size) within the super-frame display output 308, though in some examples, the displays may have different resolutions requiring appropriate padding to maintain proper alignment within the grid structure.

Some implementations that support interleaving only support images that have the same number of lines (e.g., due to hardware limitations). In an example, an implementation that supports careful padding for super-frames and applies it to interleaving may be used. Super-frames composed of subframes can have different resolutions. Padding may be used so that the sub-images of the super-frame all have the same number of lines of pixels. Two example cases for padding may include i) a case where the number of lines divide evenly and ii) a more complicated case when they do not.

Divide Evenly: As an example, suppose there are two subframes of a super-frame. If the images divide evenly then additional lines of "don't care" pixels can be inserted evenly in the smaller frame such that the number of lines of pixels match.

Do not divide evenly: A more complicated scenario is when the two images do not match evenly. In this case, the number of lines inserted will be different for each scan line to be included. Such a scenario may be vendor dependent. For example, if one display has 600 lines of pixels and another has 400 lines, then the ratio is 600/400 or 3/2. A vendor example might support having for every 3 lines of the image with 600 lines having 2 lines of the smaller image with a blank line (2 real lines plus 1 "don't care" line is 3 total) such that the total number of lines in each image is 600.

The spatial super-frame format provides a way to simultaneously view multiple displays in their entirety, enabling developers to monitor and validate the concurrent operation of multiple automotive display outputs. This format supports the system's ability to dynamically switch between viewing all displays in the grid layout or focusing on a single display in full-screen mode. The diagram demonstrates one example of how the system may composite multiple display streams prior to encoding and broadcast, allowing remote viewing and interaction with multiple automotive displays through a single video stream while maintaining zero performance overhead on the system under test. While the spatial super-frame format illustrated in FIG. 3 shows four displays, the system may support sixteen or more displays being combined into the spatial super-frame format. Further, while the displays are arranged in a grid layout, the system may adjust the relative sizes and proportions of individual displays within the grid, either through user configuration or automatic adjustment based on display resolution differences. This may include adding padding around smaller displays or adjusting display sizes to accommodate asymmetric display resolutions while maintaining proper alignment within the grid structure.

Figure 4:
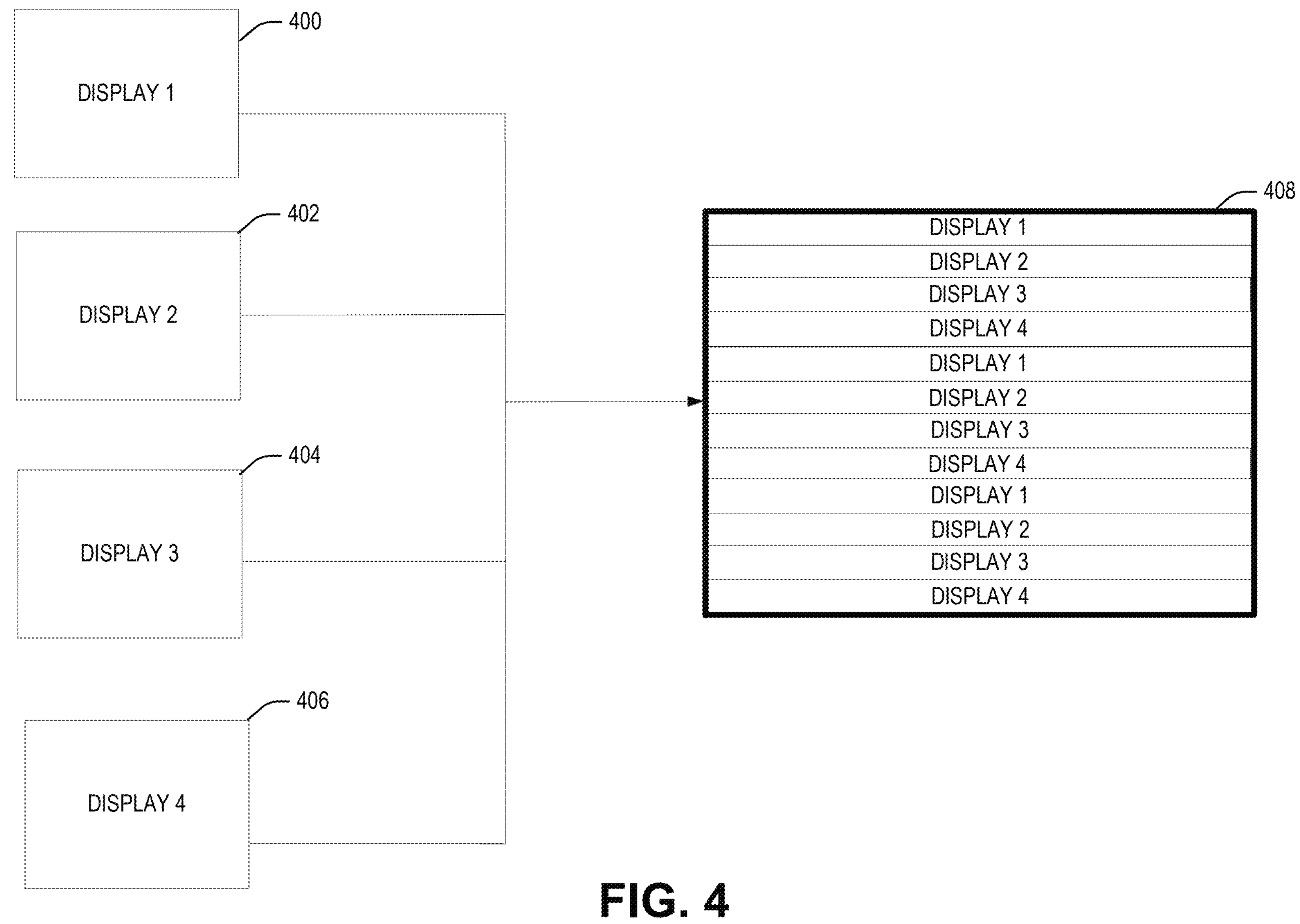
FIG. 4 is a diagram showing examples of interleaved super-frame formats according to some examples.

FIG. 4 is a diagram showing examples of interleaved super-frame formats according to some examples. The diagram illustrates how multiple independent display streams may be combined into an interleaved super-frame display output. The diagram includes four separate input displays labeled as Display 1 (400), Display 2 (402), Display 3 (404), and Display 4 (406), each represented by different boxes. These displays may correspond to different automotive display outputs such as instrument clusters, infotainment displays, digital mirrors, or other vehicle displays. The interleaved super-frame format combines the four displays by alternating scan lines from each display into a single unified super-frame display output 408. In this format, rather than arranging displays spatially in a grid, the system interleaves or alternates scan lines from each display sequentially. The interleaved format may require special handling during video capture and scaling operations. The system may either avoid scaling the content prior to deserialization or ensure that any scaling operations are specifically designed to be interleaved-format aware to maintain proper display output. The interleaved format may be utilized in various display architectures that employ SerDes implementations for automotive applications or virtualize the SerDes solution for testing purposes.

When processing displays of different resolutions in the super-frame format, the system may need to add padding lines for displays with fewer scan lines than others. The largest display in terms of number of scan lines may be positioned first, with subsequent displays sorted by size and padded as needed to maintain proper alignment and timing in the interleaved output. The interleaved super-frame format of the unified super-frame display output 408 may enable the system to combine multiple display outputs while preserving the individual display data streams in a format compatible with automotive SerDes protocols. This may allow developers to validate their software implementations using the same display formats and protocols used in production automotive systems.

Figure 5:
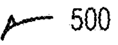
FIG. 5 illustrates generally an example method for remote display sharing and virtual serializer/deserializer (SerDes) emulation in accordance with some examples described herein.
Figure 5:
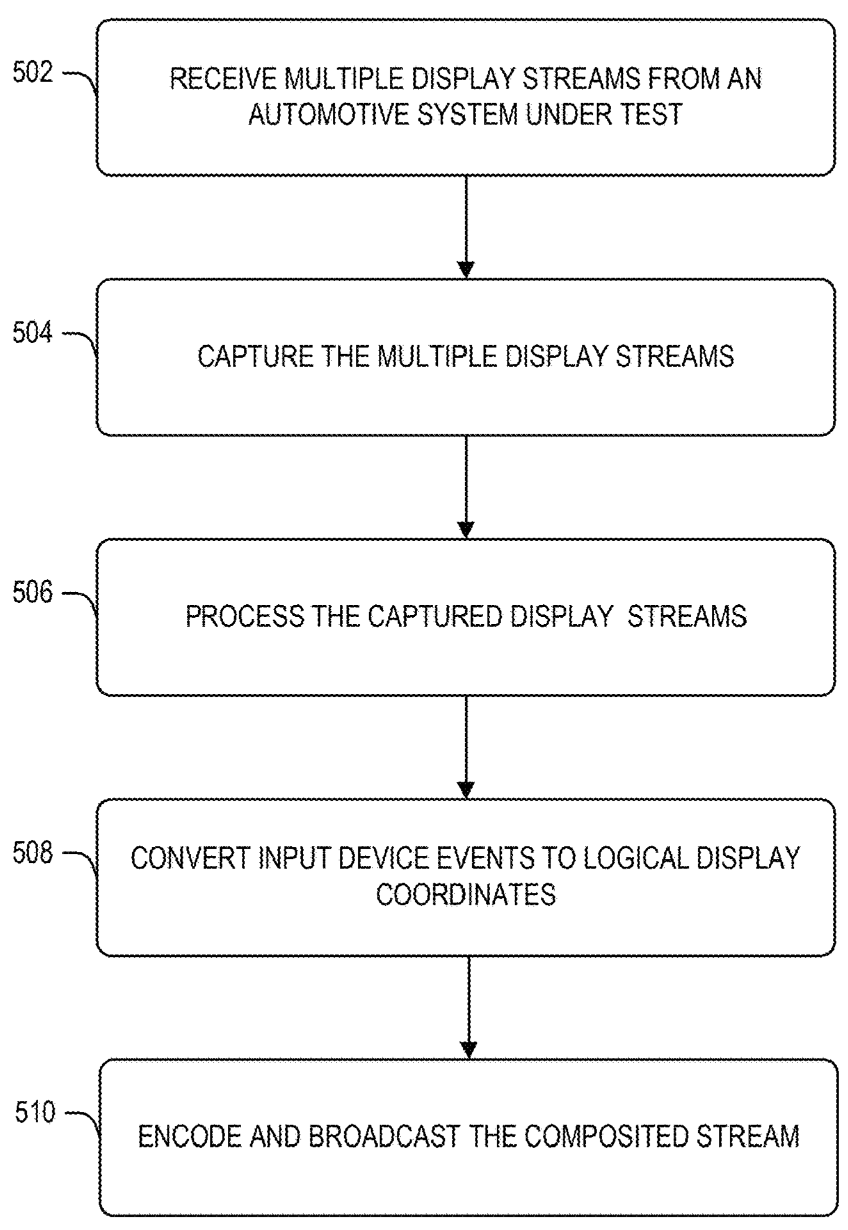

FIG. 5 illustrates generally an example method 500 for remote display sharing and virtual SerDes emulation in accordance with some examples described herein. The method may include or comprise a number of Operations. The Operations described herein are examples only, and the method may omit one or more of the listed Operations, can repeat Operations, can include other Operations, or can execute the Operations concurrently, substantially simultaneously, or in another order, as appropriate or desired.

At operation 502, the method 500 may include receiving multiple display streams from an automotive system under test. In some examples, the system may receive sixteen or more independent display streams through multiple capture cards connected to the system under test. The display streams may correspond to various automotive displays such as instrument clusters, infotainment systems, digital mirrors, heads-up displays, and other vehicle display outputs. The display streams may also correspond to industrial or robotics displays or any similar displays, as the system can connect to and process display outputs from any physical board, whether it be a standard PC, industrial board, or robotics board.

At operation 504, the method 500 may include capturing the multiple display streams. In some examples, video capture hardware processes the incoming display streams from each capture card. The capture operation may handle both spatial and interleaved display formats. For interleaved formats, the capture operation may preserve the scan line ordering and handles any padding requirements for displays of different resolutions.

At operation 506, the method 500 may include processing the captured display streams. In some examples, this may include performing virtual SerDes operations to combine multiple display streams into super-frame formats. The processing may include spatial combination where displays are arranged in a grid layout, or interleaved combination where scan lines from different displays are alternated. The processing may also include scaling operations that adjust display resolutions while maintaining format compatibility. The processing operation may also include dynamic switching between different display modes. In some examples, the system can transition between a multi-display tiled view showing all displays simultaneously and a single full-screen view of an individual display. This enables detailed inspection of potential rendering defects or anomalies that may be difficult to diagnose in the tiled view.

At operation 508, the method 500 may include converting one or more input device events to logical display coordinates. In some examples, the system may receive keyboard, mouse, and touch input events and maps them to the appropriate display based on the active display layout. For matrixed displays, the system may use relative offsetting to determine which input device should be emulated on the system under test. The coordinate conversion may be configured to maintain proper input mapping across all supported display configurations and modes.

The relative offsetting, for matrixed displays, may include performing coordinate transformations between global and local coordinate systems to properly map input device interactions. For example, when a mouse click occurs, the operating system reports the click location in global coordinates that span the entire display area. To determine which logical display was clicked and convert to the correct local coordinates, the system subtracts offset values based on the display's position in the matrix. For example, if a mouse click occurs at global coordinates [750,250] on a display positioned 500 pixels from the global origin, the system subtracts the 500 pixel offset to obtain the local coordinates [250,250] relative to that display's origin. For displays positioned both horizontally and vertically in the matrix, the system may perform offset subtraction in both X and Y dimensions to convert from global to local coordinates. This coordinate transformation ensures input events are properly mapped to the correct relative position within each logical display.

At operation 510, the method 500 may include encoding and broadcasting the composited stream. In some examples, the system may encode the processed display streams using ultra-low latency encoding to maintain responsive interaction. The encoded stream may be broadcast to multiple remote users simultaneously, enabling collaborative debugging and development across different geographic locations. In some examples, the system may record the encoded stream instead of broadcasting, storing the recording either locally or to a cloud-based storage system.

The method 500 may include additional operations such as detecting and marking anomalies in the display streams, managing multiple concurrent user sessions, and maintaining constant bit rate encoding to ensure consistent network bandwidth usage. The system may also dynamically adjust display resolution and quality based on network conditions while preserving the ability to record at native resolution for detailed analysis. In some examples, the method 500 may support extensible SerDes protocols to maintain compatibility with various automotive SerDes vendor implementations. This enables developers to validate their software using the same display formats and protocols that will be used in production automotive systems.

Figure 6:
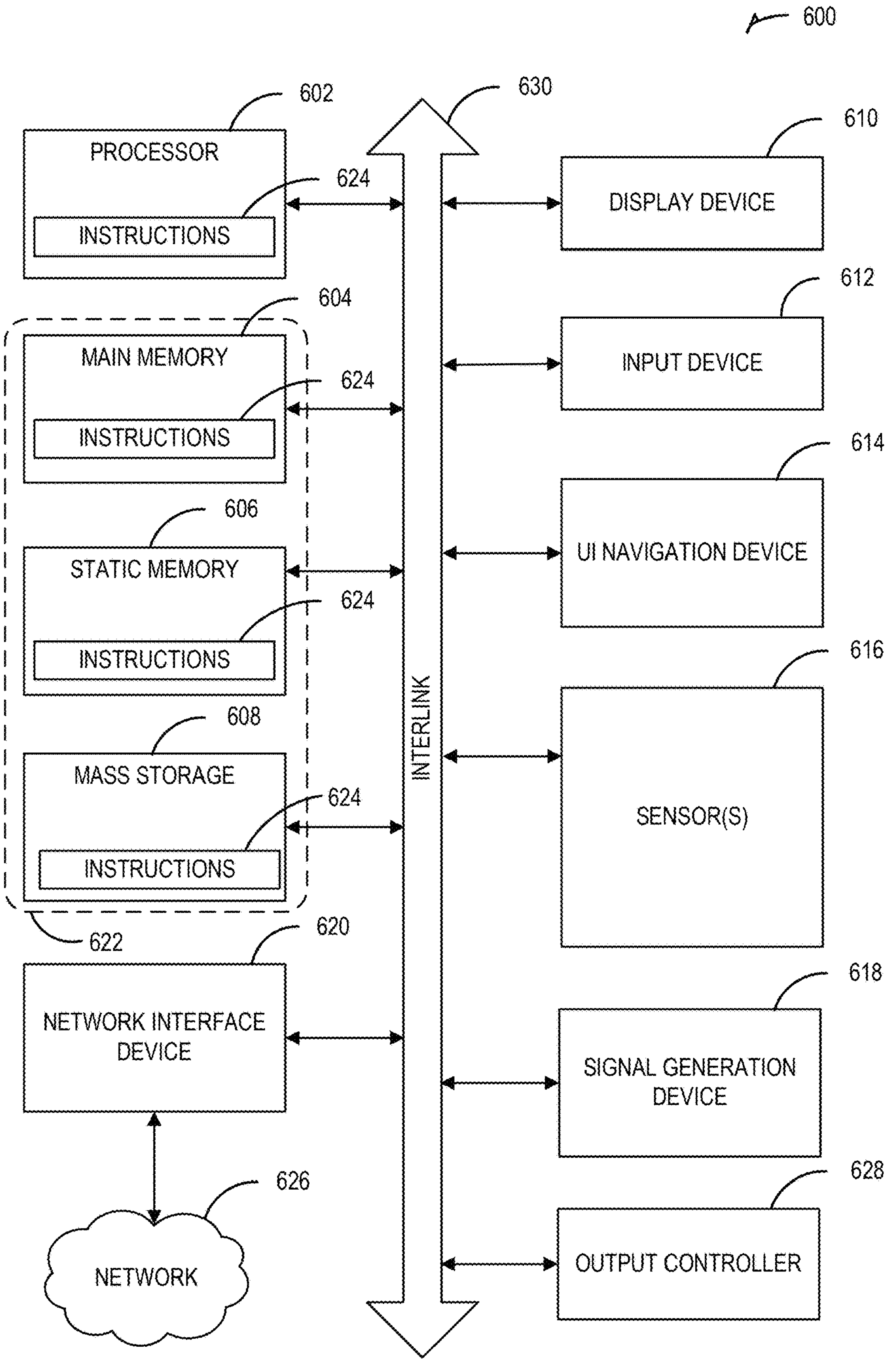
FIG. 6 is a block diagram illustrating an example of a machine upon which or with which one or more embodiments may be implemented.

FIG. 6 is a block diagram illustrating an example of a machine 600 upon which or with which one or more embodiments may be implemented. The machine 600 may include the architecture or components discussed in the earlier figures, such as the IP-KVM components, or the system-under-test components discussed above. In a networked deployment, the machine 600 may operate in the capacity of a server machine, a client machine, or both in server-client network environments. In an example, the machine 600 may act as a peer machine in peer-to-peer (P2P) (or other distributed) network environment.

The machine 600 may be a personal computer (PC), a tablet PC, a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine 600 (e.g., a computer system) may include a hardware processor 602 (e.g., a central processing unit (CPU), a graphics processing unit (GPU), a hardware processor core, field programmable gate array (FPGA), or any combination thereof), a main memory 604 and a static memory 606, some or all of which may communicate with each other via an interlink 630 (e.g., a bus). The machine 600 may further include a display unit 610, an input device 612 (e.g., an alphanumeric input device such as a keyboard), and a user interface (UI) navigation device (UI navigation device 614) (e.g., a mouse). In an example, the display unit 610, input device 612 and UI navigation device 614 may be a touch screen display. The machine 600 may additionally include a storage device 608 (e.g., drive unit), a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 608 may include a machine readable medium 622 on which is stored one or more sets of data structures or one or more instructions 624 (e.g., software) embodying or used by any one or more of the techniques or functions described herein. The one or more instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 608 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The one or more instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600, and includes digital or analog communications signals or other intangible medium to facilitate communication of such software.

ADDITIONAL NOTES & EXAMPLES

Example 1 is at least one non-transitory computer-readable medium storing instructions that, when executed by at least one processor, cause the at least one processor to: receive information from an automotive system under test; capture multiple display streams from the automotive system under test; process the multiple display streams from the automotive system under test; composite, the multiple display streams into a single stream by combining the multiple display streams into a single super-frame format; and encode and transmit the composited stream.

In Example 2, the subject matter of Example 1 optionally includes subject matter wherein compositing the multiple display streams into a single display stream is performed using virtual serializer/deserializer (virtual SerDes) operations, and wherein the instructions further cause the at least one processor to: enable multiple users to simultaneously access and interact with the multiple display streams remotely, wherein the virtual SerDes operations support at least sixteen logical displays for automotive software development and validation.

In Example 3, the subject matter of any one or more of Examples 1-2 optionally include subject matter wherein the instructions further cause the at least one processor to: provide synchronized display viewing, allowing multiple users to view identical display stream outputs simultaneously, wherein the identical display stream outputs are compatible with automotive SerDes protocols.

In Example 4, the subject matter of any one or more of Examples 1-3 optionally include subject matter wherein the instructions further cause the at least one processor to: dynamically change display compositing modes in real-time, enabling switching between a multi-display tiled view and a single display view, wherein the compositing preserves spatial and interleaved super-frame formats used in automotive applications, wherein the spatial super-frame format combines multiple displays by arranging the multiple displays in a grid layout within a single output frame, and wherein the interleaved super-frame format combines multiple displays by alternating scan lines from each display sequentially into a single output frame.

In Example 5, the subject matter of any one or more of Examples 1~4 optionally include subject matter wherein the instructions further cause the at least one processor to: allow multiple users to interact with multiple logical displays simultaneously, enabling parallel testing and debugging of automotive software validation components.

In Example 6, the subject matter of any one or more of Examples 1-5 optionally include subject matter wherein the instructions further cause the at least one processor to: at least one of transmit the received information from the automotive system under test or record the received information from the automotive system under test to a network location.

In Example 7, the subject matter of any one or more of Examples 1-6 optionally include subject matter wherein the instructions further cause the at least one processor to: detect anomalies in the received information and place markers in a recording at points where the anomalies are detected.

In Example 8, the subject matter of any one or more of Examples 1-7 optionally include subject matter wherein the instructions further cause the at least one processor to: record the received information at a native resolution.

In Example 9, the subject matter of any one or more of Examples 1-8 optionally include subject matter wherein the instructions further cause the at least one processor to: convert received keyboard and mouse events to logical display coordinates based on an active display layout.

Example 10 is an automotive video composite control system, comprising: an interface to receive multiple display streams from an automotive system; and an Internet Protocol-based Keyboard Video Mouse (IP-KVM) device configured to: receive information from the automotive system; capture the multiple display streams from the automotive system; process the multiple display streams from the automotive system under test; composite, using virtual serializer/deserializer (virtual SerDes) operations, the multiple display streams into a single stream, wherein to composite the multiple display streams includes combining the multiple display streams into a single super-frame format; and encode and transmit the composited stream.

In Example 11, the subject matter of Example 10 optionally includes subject matter wherein the IP-KVM device is further configured to: receive data from multiple logical displays from the automotive system; process the captured display streams prior to scaling and composition; combine the multiple logical displays into a single physical display output; and manage keyboard, mouse, and touch input types across the multiple logical displays.

In Example 12, the subject matter of Example 11 optionally includes subject matter wherein the IP-KVM device is further configured to allow multiple users to simultaneously access and interact with the multiple display streams remotely, wherein the IP-KVM uses the virtual SerDes operations to support at least sixteen logical displays for automotive software development and validation.

In Example 13, the subject matter of any one or more of Examples 11-12 optionally include subject matter wherein the IP-KVM device is further configured to allow multiple users to interact with different ones of the multiple logical displays simultaneously, enabling parallel testing and debugging of automotive software validation components.

In Example 14, the subject matter of any one or more of Examples 10-13 optionally include subject matter wherein the IP-KVM device is further configured to provide synchronized display viewing, allowing multiple users to view identical display stream outputs simultaneously, wherein the display stream outputs are compatible with automotive SerDes protocols.

In Example 15, the subject matter of any one or more of Examples 10-14 optionally include subject matter wherein the IP-KVM device is further configured to dynamically change display compositing modes in real-time, enabling switching between a multi-display tiled view and a single display view, and wherein the compositing modes preserve spatial and interleaved super-frame formats used in automotive applications, wherein the spatial super-frame format combines multiple displays by arranging the multiple displays in a grid layout within a single output frame, and wherein the interleaved super-frame format combines multiple displays by alternating scan lines from each display sequentially into a single output frame.

In Example 16, the subject matter of any one or more of Examples 10-15 optionally include subject matter wherein the IP-KVM device is further configured to at least one of transmit the received information from the automotive system or record the received information from the automotive system to a network location.

In Example 17, the subject matter of any one or more of Examples 10-16 optionally include subject matter wherein the IP-KVM device is further configured to detect anomalies in the received information and place markers in a recording at points where the anomalies are detected.

In Example 18, the subject matter of any one or more of Examples 10-17 optionally include subject matter wherein the IP-KVM device is configured to record the received information at a native resolution.

In Example 19, the subject matter of any one or more of Examples 10-18 optionally include subject matter wherein the IP-KVM device is configured to receive display configuration events and update a current display state based on the received display configuration events.

In Example 20, the subject matter of any one or more of Examples 10-19 optionally include subject matter wherein the IP-KVM device is configured to convert received keyboard and mouse events to logical display coordinates based on an active display layout.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory computer-readable medium storing instructions that, when executed by at least one processor of an Internet Protocol-based Keyboard Video Mouse (IP-KVM) device, cause the at least one processor to:

receive information from an automotive system under test;

capture multiple display streams from the automotive system under test;

process the multiple display streams from the automotive system under test;

composite, using virtual serializer/deserializer (virtual SerDes) operations, the multiple display streams into a single stream by combining the multiple display streams into a single super-frame format; and encode and transmit the composited stream.

2. The non-transitory computer-readable medium of claim 1, wherein the instructions further cause the at least one processor to:

enable multiple users to simultaneously access and interact with the multiple display streams remotely, via the virtual SerDes operations that support at least sixteen logical displays for automotive software development and validation.

3. The non-transitory computer-readable medium of claim 1, wherein the instructions further cause the at least one processor to:

provide synchronized display viewing, allowing multiple users to view identical display stream outputs simultaneously.

4. The non-transitory computer-readable medium of claim 1, wherein the instructions further cause the at least one processor to:

dynamically change display compositing modes in real-time, enabling switching between a multi-display tiled view and a single display view, wherein the compositing preserves spatial and interleaved super-frame formats used in automotive applications, wherein the spatial super-frame format combines multiple displays by arranging the multiple displays in a grid layout within a single output frame, and wherein the interleaved super-frame format combines multiple displays by alternating scan lines from each display sequentially into a single output frame.

5. The non-transitory computer-readable medium of claim 1, wherein the instructions further cause the at least one processor to:

allow multiple users to interact with multiple logical displays simultaneously, enabling parallel testing and debugging of automotive software validation components.

6. The non-transitory computer-readable medium of claim 1, wherein the instructions further cause the at least one processor to:

at least one of transmit the received information from the automotive system under test or record the received information from the automotive system under test to a network location.

7. The non-transitory computer-readable medium of claim 1, wherein the instructions further cause the at least one processor to:

detect anomalies in the received information and place markers in a recording at points where the anomalies are detected.

8. The non-transitory computer-readable medium of claim 1, wherein the instructions further cause the at least one processor to:

record the received information at a native resolution.

9. The non-transitory computer-readable medium of claim 1, wherein the instructions further cause the at least one processor to:

convert received keyboard and mouse events to logical display coordinates based on an active display layout.

10. An automotive video composite control system, comprising:

an interface to receive multiple display streams from an automotive system; and an Internet Protocol-based Keyboard Video Mouse (IP-KVM) device configured to:

receive information from the automotive system;

capture the multiple display streams from the automotive system;

process the multiple display streams from the automotive system;

composite, using virtual serializer/deserializer (virtual SerDes) operations, the multiple display streams into a single stream, wherein to composite the multiple display streams includes combining the multiple display streams into a single super-frame format; and encode and transmit the composited stream.

11. The system of claim 10, wherein the IP-KVM device is further configured to:

receive data from multiple logical displays from the automotive system;

process the captured display streams prior to scaling and composition;

combine the multiple logical displays into a single physical display output; and manage keyboard, mouse, and touch input types across the multiple logical displays.

12. The system of claim 11, wherein the IP-KVM device is further configured to allow multiple users to simultaneously access and interact with the multiple display streams remotely, wherein the IP-KVM uses the virtual SerDes operations to support at least sixteen logical displays for automotive software development and validation.

13. The system of claim 11, wherein the IP-KVM device is further configured to allow multiple users to interact with different ones of the multiple logical displays simultaneously, enabling parallel testing and debugging of automotive software validation components.

14. The system of claim 10, wherein the IP-KVM device is further configured to provide synchronized display viewing, allowing multiple users to view identical display stream outputs simultaneously, wherein the display stream outputs are compatible with automotive SerDes protocols.

15. The system of claim 10, wherein the IP-KVM device is further configured to dynamically change display compositing modes in real-time, enabling switching between a multi-display tiled view and a single display view, and wherein the compositing modes preserve spatial and interleaved super-frame formats used in automotive applications, wherein the spatial super-frame format combines multiple displays by arranging the multiple displays in a grid layout within a single output frame, and wherein the interleaved super-frame format combines multiple displays by alternating scan lines from each display sequentially into a single output frame.

16. The system of claim 10, wherein the IP-KVM device is further configured to at least one of transmit the received information from the automotive system or record the received information from the automotive system to a network location.

17. The system of claim 10, wherein the IP-KVM device is further configured to detect anomalies in the received information and place markers in a recording at points where the anomalies are detected.

18. The system of claim 10, wherein the IP-KVM device is configured to record the received information at a native resolution.

19. The system of claim 10, wherein the IP-KVM device is configured to receive display configuration events and update a current display state based on the received display configuration events.

20. The system of claim 10, wherein the IP-KVM device is configured to convert received keyboard and mouse events to logical display coordinates based on an active display layout.

* * * * *